US011331786B2

(12) United States Patent
Castro et al.

(10) Patent No.: US 11,331,786 B2
(45) Date of Patent: May 17, 2022

(54) WIRING HARNESS LAYOUT TABLE WITH ROTATABLE WORK SURFACES

(71) Applicant: Gulfstream Aerospace Corporation, Savannah, GA (US)

(72) Inventors: Jorge Israel Verdugo Castro, Mexicali Baja California (MX); Jose Antonio Martinez Robledo, Mexicali Baja California (MX); Jaime Montes Vasquez, Mexicali Baja California (MX)

(73) Assignee: Gulfstream Aerospace Corporation, Savannah, GA (US)

( * ) Notice: Subject to any disclaimer, the term of this patent is extended or adjusted under 35 U.S.C. 154(b) by 739 days.

(21) Appl. No.: 16/210,827

(22) Filed: Dec. 5, 2018

(65) Prior Publication Data

US 2019/0168375 A1 Jun. 6, 2019

Related U.S. Application Data

(60) Provisional application No. 62/595,309, filed on Dec. 6, 2017.

(51) Int. Cl.
*B23Q 3/00* (2006.01)
*B25H 1/18* (2006.01)
(Continued)

(52) U.S. Cl.
CPC ............... *B25H 1/18* (2013.01); *A47B 13/08* (2013.01); *A47B 13/081* (2013.01); *A47B 37/00* (2013.01);
(Continued)

(58) Field of Classification Search
CPC .. B25H 1/18; B25H 1/02; A47B 13/08; A47B 85/06; A47B 2200/0036
(Continued)

(56) References Cited

U.S. PATENT DOCUMENTS 4,469,029 A 9/1984 Ramond
4,943,040 A 7/1990 Finstad et al.
(Continued)

FOREIGN PATENT DOCUMENTS

DE 1813499 U 6/1960
DE 2748753 A1 5/1979
(Continued)

OTHER PUBLICATIONS

The German Patent and Trademark Office, Search Report for Application No. 102018130786.1, dated Jun. 19, 2020.

*Primary Examiner* — Joseph J Hail
*Assistant Examiner* — Shantese L McDonald
(74) *Attorney, Agent, or Firm* — LKGlobal | Lorenz & Kopf, LLP

(57) ABSTRACT

A table includes a frame, a rotatable component, and a rotation mechanism. The frame has a pair of rotation bearings. The rotatable component has a first rotation position and a second rotation position. The rotatable component includes a pair of pivot portions supported by the pair of rotation bearings. The rotatable component further includes a first work surface configured to support preparation of a first wiring harness in the first rotation position. The rotatable component further includes a second work surface configured to support preparation of a second wiring harness in the second rotation position. The rotation mechanism is
(Continued)

coupled with the rotatable component and is configured to rotate the rotatable component between at least the first rotation position and the second rotation position.

17 Claims, 2 Drawing Sheets

(51) Int. Cl.

| | |
|---|---|
| ***B25H 1/02*** | (2006.01) |
| ***A47B 13/08*** | (2006.01) |
| ***A47B 37/00*** | (2006.01) |
| ***A47B 85/06*** | (2006.01) |
| *A47B 27/00* | (2006.01) |

(52) U.S. Cl.

CPC ............... *A47B 85/06* (2013.01); *B25H 1/02* (2013.01); *A47B 27/00* (2013.01); *A47B 2200/0036* (2013.01)

(58) Field of Classification Search

USPC .................................................. 269/309, 311

See application file for complete search history.

(56) References Cited

U.S. PATENT DOCUMENTS

| | | | | | |
|---|---|---|---|---|---|
| 4,979,544 | A * | 12/1990 | Swindlehurst | H01B 13/01227 | 140/92.1 |
| 5,109,597 | A * | 5/1992 | Elder | H01B 13/01227 | 140/92.1 |
| 6,926,278 | B2 * | 8/2005 | Bibi | A63F 3/00895 | 273/284 |
| 7,785,208 | B2 * | 8/2010 | Voden | A63D 15/00 | 473/10 |
| 7,975,624 | B2 * | 7/2011 | Henriott | A47B 21/00 | 108/50.02 |
| 2005/0104294 | A1 * | 5/2005 | Chen | A63B 67/04 | 273/309 |
| 2015/0283574 | A1 | 10/2015 | Waterston | | |

FOREIGN PATENT DOCUMENTS

| | | | |
|---|---|---|---|
| DE | 102005018513 | A1 | 10/2006 |
| DE | 102010042178 | A1 | 4/2012 |
| DE | 202014105783 | U1 | 2/2015 |

* cited by examiner

WIRING HARNESS LAYOUT TABLE WITH ROTATABLE WORK SURFACES

CROSS-REFERENCE TO RELATED APPLICATIONS

This application claims the benefit of U.S. Provisional Application No. 62/595,309 filed on Dec. 6, 2017. The disclosure of the above application is incorporated herein by reference.

TECHNICAL FIELD

Embodiments of the present invention generally relate to electrical wiring harness layout tables, and more particularly relate to electrical wiring harness layout tables with multiple rotatable work surfaces.

BACKGROUND OF THE INVENTION

The large number of components and the redundancy requirements on aircraft often result in very large and heavy wiring harnesses that contain the electrical wires used for electrical communication and power delivery on the aircraft. The wires contained within a wire bundle of the wire harness are cut to size, placed in the appropriate location on a table, and fitted with various electrical connectors. After assembling such a wire harness, the electrical connections are tested to confirm the electrical connectors are properly installed. The equipment used to test the electrical connections, however, is not always available when the wiring harness finished assembly. To begin assembly of a new wiring harness while waiting for the testing equipment, conventional manufacturing methods typically remove the wiring harness from the table. The wiring harness may need to be placed back on the table for testing and/or rework. The removal and replacement of the wiring harnesses adds time and is not ergonomically desirable.

As such, it is desirable to provide tables for improving manufacturing methods for assembling wiring harnesses. In addition, other desirable features and characteristics will become apparent from the subsequent summary and detailed description, and the appended claims, taken in conjunction with the accompanying drawings and this background.

SUMMARY

Various non-limiting embodiments of wiring harness layout tables are disclosed herein.

In a first non-limiting embodiment, a table includes, but is not limited to, a frame, a rotatable component, and a rotation mechanism. The frame has a pair of rotation bearings. The rotatable component has a first rotation position and a second rotation position. The rotatable component includes a pair of pivot portions supported by the pair of rotation bearings. The rotatable component further includes a first work surface configured to support preparation of a first wiring harness in the first rotation position. The rotatable component further includes a second work surface configured to support preparation of a second wiring harness in the second rotation position. The rotation mechanism is coupled with the rotatable component and is configured to rotate the rotatable component between at least the first rotation position and the second rotation position.

In a second non-limiting embodiment, a wiring harness layout table includes, but is not limited to, a frame, a rotatable component, and a rotation mechanism. The frame has a pair of rotation bearings. The rotatable component has a first rotation position and a second rotation position. The rotatable component includes a pair of pivot portions supported by the pair of rotation bearings. The rotatable component further includes a first work surface configured to support preparation of a first wiring harness in the first rotation position. The rotatable component further includes a second work surface configured to support preparation of a second wiring harness in the second rotation position. The rotation mechanism is coupled with the rotatable component and is configured to rotate the rotatable component between at least the first rotation position and the second rotation position. The locking mechanism is selectively engageable between the rotatable component and the frame to restrict rotation of the rotatable component.

In a third non-limiting embodiment, wiring harness layout table for assembling a wiring harness for an aircraft includes, but is not limited to, a frame, a rotatable component, and a rotation mechanism. The frame has a pair of rotation bearings. The rotatable component has a first rotation position and a second rotation position. The rotatable component includes a pair of pivot portions supported by the pair of rotation bearings. The rotatable component further includes a first work surface configured to support preparation of a first wiring harness in the first rotation position. The rotatable component further includes a second work surface configured to support preparation of a second wiring harness in the second rotation position. The rotatable component further yet includes restraint features disposed on the first work surface and the second work surface, the restraint features configured to restrict movement of the first wiring harness and the second wiring harness when the rotatable component rotates between the first rotation position and the second rotation position. The rotation mechanism is coupled with the rotatable component and is configured to rotate the rotatable component between at least the first rotation position and the second rotation position. The locking mechanism is selectively engageable between the rotatable component and the frame to restrict rotation of the rotatable component.

DESCRIPTION OF THE DRAWINGS

Advantages of the present embodiments will be readily appreciated as the embodiments becomes better understood by reference to the following detailed description, when considered in connection with the accompanying drawings wherein.

DESCRIPTION OF EXEMPLARY EMBODIMENTS

The following detailed description is merely exemplary in nature and is not intended to limit the disclosure or the application and uses of the disclosure. Furthermore, there is no intention to be bound by any theory presented in the preceding background or the following detailed description.

The embodiments provided herein generally provide wiring harness layout tables with rotatable worktops that permit multiple wiring harnesses to be prepared on the same table without removal of previously prepared wiring harnesses. For example, testing equipment for testing the connections of the wiring harness may not be immediately available to finalize the wiring harness preparation. The table may rotate into a different position to make available a new work surface for preparing a new wiring harness until the testing equipment is available. Because the wiring harness is not removed, any rework indicated by the testing equipment may be performed without additional laying out of the wiring harness that is indicated to be reworked.

Figure 1:
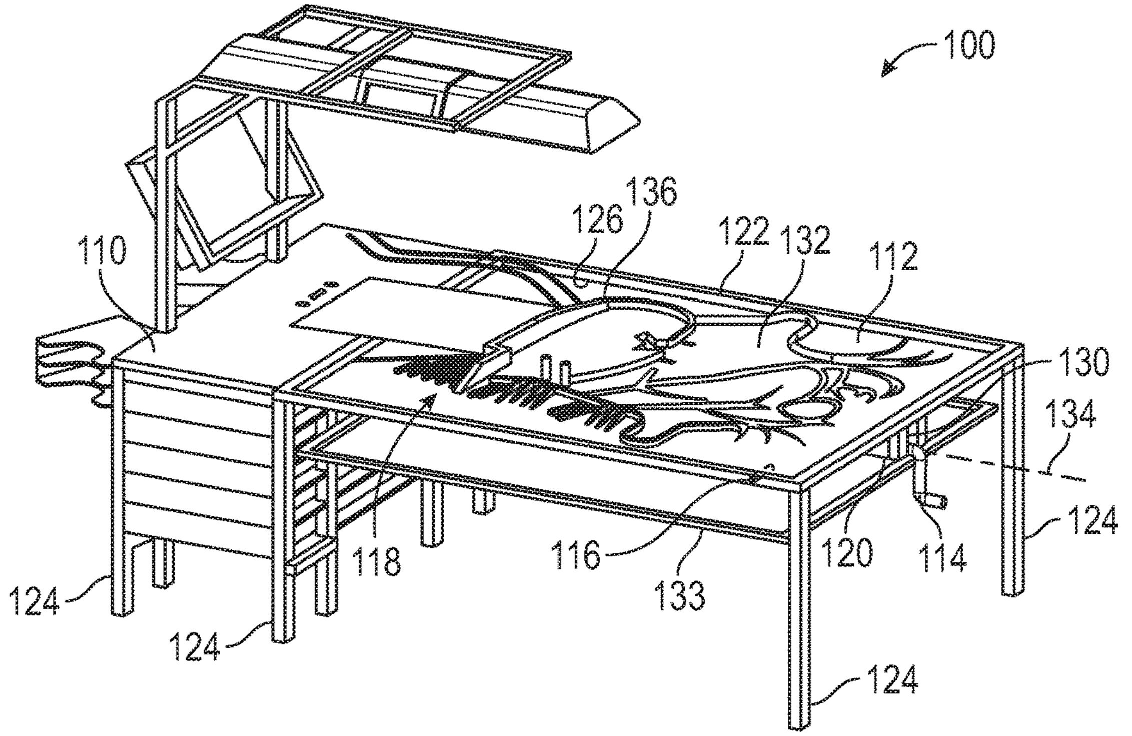
FIG. 1 is a simplified diagram illustrating a non-limiting embodiment of a wiring harness layout table in accordance with the teachings of the present disclosure.
Figure 2:
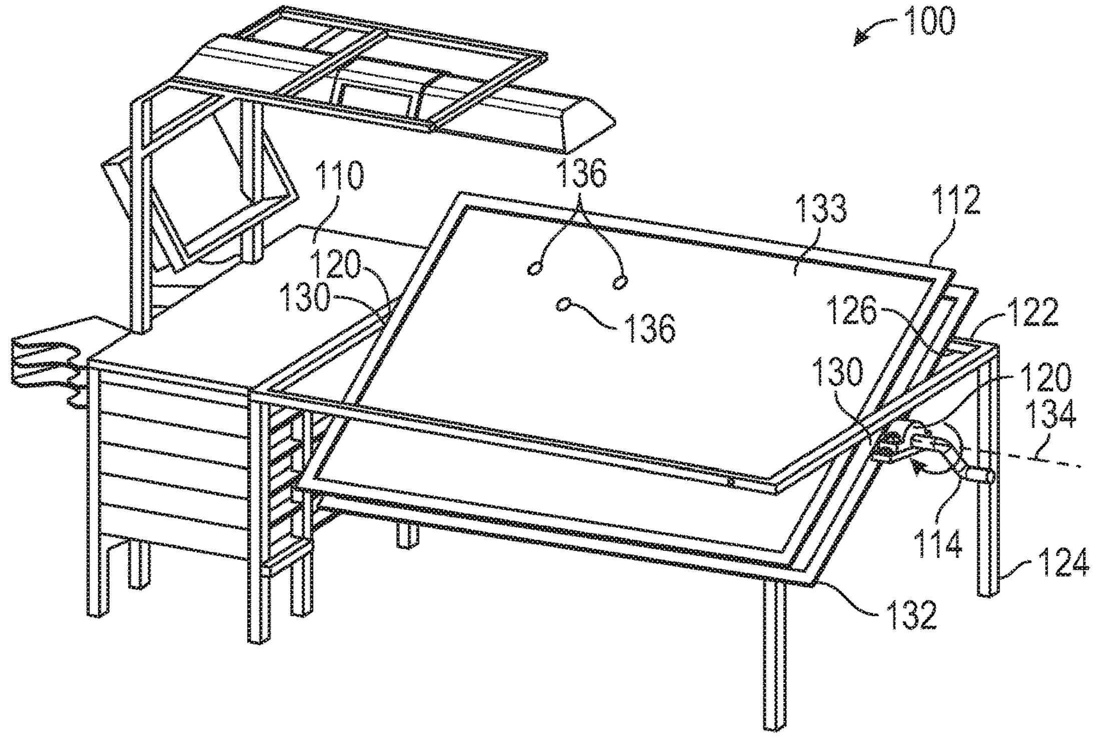
FIG. 2 is a simplified diagram illustrating the wiring harness layout table of FIG. 1 with a rotatable component in a partially rotated position in accordance with the teachings of the present disclosure.

FIGS. 1 and 2 illustrate a non-limiting embodiment of a wiring harness layout table 100 in two positions. Wiring harness layout table 100 includes frame 110, a rotatable component 112, a rotation mechanism 114, and a locking mechanism 116. In the example provided, wiring harness layout table 100 supports preparation of wiring harnesses 118 for installation in aircraft. Wiring harnesses 118 are often long, heavy, and difficult to maneuver once assembled.

Frame 110 has a pair of rotation bearings 120, a border portion 122, and legs 124. Rotation bearings 120 support rotatable component 112 and define an axis of rotation 134 of rotatable component 112. In the example provided, rotation bearings 120 are ball bearings. In some examples, rotation bearings 120 are gears of a gear train coupled with rotation mechanism 114. It should be appreciated that any type of rotation bearing 120 that supports and permits rotation of rotatable component 112 may be utilized without departing from the scope of the present disclosure. For example, rotation bearings 120 may simply be apertures with low friction surfaces against which a cylinder of rotatable component 112 slides.

Frame 110 defines border portion 122 to enclose a work area 126 in which rotatable component is located. In the example provided, border portion 122 encloses a rectangular work area 126 and is disposed around a periphery of a rectangular work surface of rotatable component 112, as will be discussed below.

Legs 124 support the weight of frame 110. In the example provided, one of legs 124 is disposed at each corner of border portion 122. The location and number of legs 124 may vary without departing from the scope of the present disclosure. In some embodiments, legs 124 are omitted and frame 110 is suspended from a ceiling or other overhead structure.

Rotatable component 112 has a pair of pivot portions 130, a first work surface 132, and a second work surface 133. Rotatable component 112 rotates into various positions to orient first work surface 132 or second work surface 133 as an upper work surface for assembling wiring harnesses. In other words, rotation of rotatable component 112 exposes different work surfaces for preparation of different wiring harnesses.

Pivot portions 130 are supported by rotation bearings 120 to define an axis of rotation 134. In the example provided, axis of rotation 134 is longitudinally oriented at a lateral center of rotatable component 112. In some examples, axis of rotation 134 is oriented in a different direction, such as lateral alignment on rotatable component 112. In some examples, multiple rotatable components 112 with multiple axes of rotation 134 are utilized in a single frame 110.

In the example provided, pivot portions 130 are shafts that engage with the ball bearings of rotation bearings 120. When rotation bearings 120 are gears, pivot portions 130 are gears that engage with the gears of rotation bearings 120.

Rotatable component 112 rotates between at least a first rotation position with first work surface 132 facing upwards and a second rotation position with second work surface 133 facing upwards. The first position is illustrated in FIG. 1, and the second position is similar to FIG. 1 with transposed first and second work surfaces 132, 133.

First work surface 132 is configured to support preparation of a first wiring harness 118 in the first rotation position and second work surface 133 is configured to support preparation of a second wiring harness (not illustrated) in the second rotation position. In the example provided, work surfaces 132 are configured to support preparation of wiring harnesses by including restraint features 136 and receiving layout schematics. Restraint features 136 may be any feature that holds bundles of wires together and against the respective work surface 132, 133 to restrict movement of the harness when the rotatable component rotates between the first rotation position and the second rotation position.

In the example provided, restraint features 136 are apertures for receiving zip ties. Other restraint features, such as hook and loop fasteners, rubber straps, rope, twine, or other wire bundling features may be utilized without departing from the scope of the present disclosure.

In the example provided, first work surface 132 substantially fills work area 126 in the first rotation position and second work surface 133 substantially fills work area 126 in the second rotation position. In other words, rotatable component 112 occupies substantially all of the area enclosed by border portion 122 so that border portion 122 circumscribes the respective work surface 132, 133 in the first and second positions. In some alternative examples, border portion 122 is not completely closed and does not circumscribe work surfaces 132, 133.

In the example provided in FIGS. 1-2, first work surface 132 and second work surface 133 are substantially flat. In some examples, work surfaces 132, 133 may have different shapes.

Figure 3:
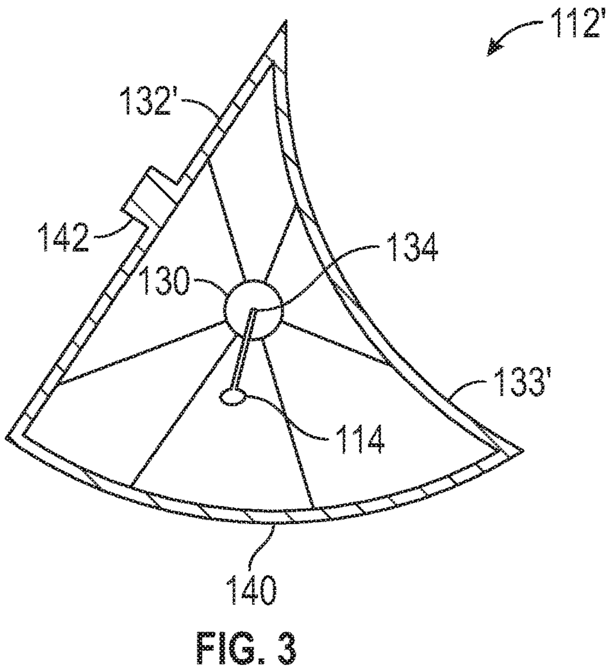
FIG. 3 is a simplified front view illustrating an alternative rotatable component for use with the wiring harness layout table of FIG. 1 in accordance with the teachings of the present disclosure.

Referring now to FIG. 3, and with continued reference to FIGS. 1-3, a rotatable component 112' for use with wiring harness layout table 100 is illustrated in accordance with the teachings of the present disclosure. Rotatable component 112' is similar to rotatable component 112, where like numbers refer to like components. Rotatable component 112', however, includes first work surface 132', second work surface 133', and a third work surface 140. First work surface 132' faces upwards in a first rotation position of rotatable component 112', second work surface 133' faces upwards in a second rotation position of rotatable component 112', and third work surface 140 faces upwards in a third rotation position of rotatable component 112'. Accordingly, three different wiring harnesses may be assembled on rotatable component 112' without removal of any previously assembled wiring harness.

Work surfaces 132', 133', and 140 have contoured shapes to permit assembly of wiring harnesses that will be installed in locations with complex curvatures. The curvature of the work surface at least partially designs the unstrained shape of the wiring harness when bundled. For example, a profile of a fuselage of an aircraft is curved. The curvature of the fuselage may be accounted for on a flat work surface for wiring installations running vertically in the fuselage by curving the wiring bundles on the flat surface. Wiring installations requiring bends or non-straight vertical installations, however, may have more complex bending than can be accurately approximated on a two-dimensional flat work surface. When the complex bending is not accounted for in the wiring assembly, the outer wires in a wiring harness bundle may be strained when installed. Accordingly, work surfaces 132', 133', and 140 define installed profiles configured to approximate a shape of an installation location into which the respective wiring harnesses prepared on work surfaces 132, 133', and 140 are configured to be installed.

In the example provided, first work surface 132' defines an installed profile that is substantially similar to a shape of an installation location of a portion of an aircraft. For example, a raised feature 142 may represent a floor to wall transition in an aircraft. Accordingly, a wiring bundle may be assembled on first work surface 132' to define an unstrained shape of wiring bundle and limit strain on individual wires of the wiring bundle when the wiring bundle is installed in the installation location.

Second work surface 133' defines a concave profile. In the example provided, the concave profile has a curvature that is substantially similar to a fuselage of the aircraft into which the wiring bundle is to be installed. For example, second work surface 133' may be utilized to prepare wiring harnesses that are to be installed on an interior facing side of components in the fuselage of the aircraft. The concave profile may have any radius of curvature without departing from the scope of the present disclosure.

Third work surface 140 is configured to support preparation of a third wiring harness in the third rotation position and defines a convex profile. For example, the convex profile may be utilized to prepare wiring harnesses that are to be installed on an outer side of cabin closeouts or other curved components installed in the fuselage. It should be appreciated that the number of work surfaces and the shape of the individual work surfaces may vary without departing from the scope of the present disclosure.

Referring again to FIGS. 1-2, and with continued reference to FIG. 3, rotation mechanism 114 is coupled with rotatable component 112 and is configured to rotate rotatable component 112 between at least the first position, the second position, and the third position. In the example provided, rotation mechanism 114 is a rotary handle coupled with pivot portion 130 of rotatable component 112. The rotary handle directly applies rotation torque to rotatable component 112. In some examples, gears, electric motors, and other rotary actuators are utilized in addition to or instead of the rotary handle.

Locking mechanism 116 is selectively engageable between rotatable component 112 and frame 110 to restrict rotation of rotatable component 112. For example, locking mechanism 116 may be engaged to restrict rotation during assembly of a wiring harness and disengaged to enable rotation of rotatable component 112 to expose a different work surface. In the example provided, locking mechanism 116 is a pin that travels through apertures in frame 110 and rotatable component 112 to restrict rotation of rotatable component 112.

Figure 4:
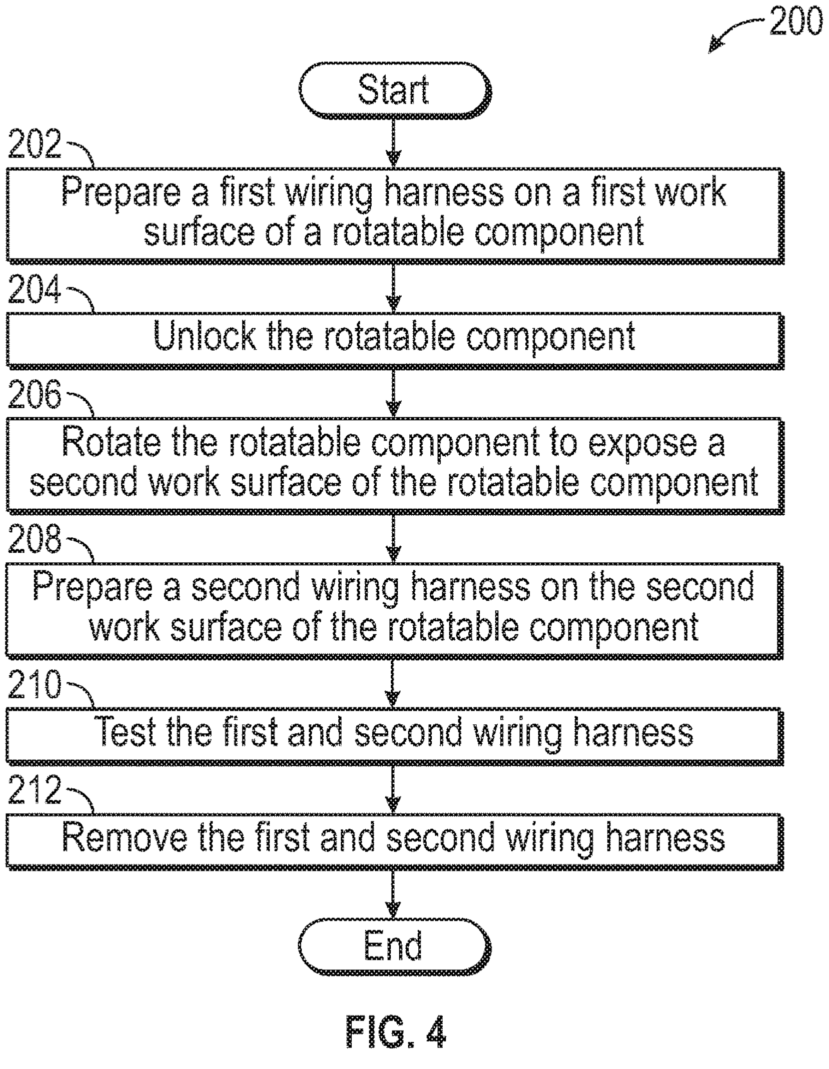
FIG. 4 is a flow diagram illustrating a non-limiting embodiment of a method for operating the wiring harness layout table of FIG. 1 in accordance with the teachings of the present disclosure.

Referring now to FIG. 4, and with continued reference to FIGS. 1-3, a non-limiting embodiment of a method 200 of manufacture for operating the wiring harness layout table of FIG. 1 is illustrated in accordance with the teachings of the present disclosure.

Task 202 prepares a first wiring harness on a first work surface of a rotatable component of a wiring harness layout table. For example, wiring harness 118 may be assembled on first work surface 132 of wiring harness layout table 100 by cutting, arranging, crimping, terminating, and securing wires of wiring harness 118.

Task 204 unlocks the rotatable component. For example, locking mechanism 116 may be removed to unlock rotatable component 112. Task 206 rotates the rotatable component to expose a second work surface of the rotatable component. For example, a rotation mechanism 114 may be utilized to rotate rotatable component 112 until second work surface 133 is facing upwards.

Task 208 prepares a second wiring harness on the second work surface of the rotatable component. For example, a second wiring harness may be assembled on second work surface 133 of wiring harness layout table 100 by cutting, arranging, crimping, terminating, and securing wires of a second wiring harness.

Task 210 tests the first and second wiring harnesses. For example, when testing equipment is available, the second wiring harness may be tested before or after first wiring harness is tested by rotation of the rotatable component.

Task 212 removes the first and second wiring harnesses. For example, the respective wiring harness disposed on the exposed work surface 132 or 133 may be removed from rotatable component 112 for installation into the aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A table, comprising:

a frame having a pair of rotation bearings;

a rotatable component having a first rotation position and a second rotation position, the rotatable component comprising:

a pair of pivot portions supported by the pair of rotation bearings;

a first work surface configured to support preparation of a first wiring harness in the first rotation position, the first work surface having a concave profile with curvature corresponding to a fuselage of an aircraft, wherein the rotatable component orients the first work surface as an exposed upper work surface when in the first rotation position; and a second work surface, different than and distinct from the first work surface, configured to support preparation of a second wiring harness in the second rotation position, the second work surface having a convex profile with curvature corresponding to curved components of an aircraft, wherein the rotatable component orients the second work surface as the exposed upper work surface when in the second rotation position; and a rotation mechanism coupled with the rotatable component and configured to rotate the rotatable component between at least the first rotation position and the second rotation position.

2. The table of claim 1, wherein the rotatable component further has a third rotation position, the rotatable component further comprising a third work surface configured to support preparation of a third wiring harness in the third rotation position.

3. The table of claim 1, wherein the first work surface defines an installed profile configured to approximate a shape of an installation location into which the first wiring harness is configured to be installed.

4. The table of claim 3, wherein the installation location is a portion of an aircraft.

5. The table of claim 1, further comprising a locking mechanism selectively engageable between the rotatable component and the frame to restrict rotation of the rotatable component.

6. The table of claim 5, wherein the locking mechanism is a pin.

7. The table of claim 1, wherein the frame defines a border portion enclosing a work area, and wherein the first work surface substantially fills the work area in the first rotation position and the second work surface substantially fills the work area in the second rotation position.

8. The table of claim 7, wherein the border portion encloses a rectangular work area as the work area.

9. The table of claim 8, the frame further comprising a leg disposed at each corner of the border portion.

10. The table of claim 1, wherein the first work surface and the second work surface include restraint features configured to restrict movement of the first wiring harness and the second wiring harness when the rotatable component rotates between the first rotation position and the second rotation position.

11. A wiring harness layout table, comprising:
- a frame having a pair of rotation bearings;
- a rotatable component having a first rotation position and a second rotation position, the rotatable component comprising:
  - a pair of pivot portions supported by the pair of rotation bearings;
  - a first work surface configured to support preparation of a first wiring harness in the first rotation position, the first work surface having a concave profile with curvature corresponding to a fuselage of an aircraft, wherein the rotatable component orients the first work surface as an exposed upper work surface when in the first rotation position; and
  - a second work surface, different than and distinct from the first work surface, configured to support preparation of a second wiring harness in the second rotation position, the second work surface having a convex profile with curvature corresponding to curved components of an aircraft, wherein the rotatable component orients the second work surface as the exposed upper work surface when in the second rotation position;
- a rotation mechanism coupled with the rotatable component and configured to rotate the rotatable component between at least the first rotation position and the second rotation position; and
- a locking mechanism selectively engageable between the rotatable component and the frame to restrict rotation of the rotatable component.

12. The wiring harness layout table of claim 11, wherein the rotatable component further has a third rotation position, the rotatable component further comprising a third work surface configured to support preparation of a third wiring harness in the third rotation position.

13. The wiring harness layout table of claim 11, wherein the first work surface defines an installed profile configured to approximate a shape of an installation location into which the first wiring harness is configured to be installed.

14. The wiring harness layout table of claim 11, wherein the frame defines a border portion enclosing a work area, and wherein the first work surface substantially fills the work area in the first rotation position and the second work surface substantially fills the work area in the second rotation position.

15. The wiring harness layout table of claim 14, wherein the border portion encloses a rectangular work area as the work area.

16. A wiring harness layout table for assembling a wiring harness for an aircraft, the wiring harness layout table comprising:
- a frame having a pair of rotation bearings;
- a rotatable component having a first rotation position and a second rotation position, the rotatable component comprising:
  - a pair of pivot portions supported by the pair of rotation bearings;
  - a first work surface configured to support preparation of a first wiring harness in the first rotation position, the first work surface having a concave profile with curvature corresponding to a fuselage of the aircraft, wherein the rotatable component orients the first work surface as an exposed upper work surface when in the first rotation position; and
  - a second work surface, different than and distinct from the first work surface, configured to support preparation of a second wiring harness in the second rotation position, the second work surface having a convex profile with curvature corresponding to curved components of an aircraft, wherein the rotatable component orients the second work surface as the exposed upper work surface when in the second rotation position;
  - restraint features disposed on the first work surface and the second work surface, the restraint features configured to restrict movement of the first wiring harness and the second wiring harness when the rotatable component rotates between the first rotation position and the second rotation position;
- a rotation mechanism coupled with the rotatable component and configured to rotate the rotatable component between at least the first rotation position and the second rotation position; and
- a locking mechanism selectively engageable between the rotatable component and the frame to restrict rotation of the rotatable component.

17. The wiring harness layout table of claim 16, wherein the rotatable component further has a third rotation position, the rotatable component further comprising a third work surface configured to support preparation of a third wiring harness in the third rotation position.

* * * * *